United States Patent [19]

Mori

[11] Patent Number: 4,560,238
[45] Date of Patent: Dec. 24, 1985

[54] LIGHT TRANSMISSION CONTROL APPARATUS

[76] Inventor: Kei Mori, 3-16-3-501, Kaminoge, Setagaya-ku, Tokyo, Japan

[21] Appl. No.: 452,978

[22] Filed: Dec. 27, 1982

[30] Foreign Application Priority Data

Jan. 9, 1982 [JP] Japan .................. 57-2155

[51] Int. Cl.⁴ .................. G02B 26/02
[52] U.S. Cl. .................. 350/266; 350/96.15
[58] Field of Search .............. 350/266, 271, 272, 448, 350/450, 315, 96.15, 96.16, 276 R, 276 SL, 96.1, 96.18

[56] References Cited

U.S. PATENT DOCUMENTS

| | | | |
|---|---|---|---|
| 593,993 | 11/1897 | Elwood | 350/448 |
| 2,380,216 | 7/1945 | Carter | 350/448 |
| 3,039,349 | 6/1962 | Rodgers | 350/276 SL |
| 3,480,347 | 11/1969 | Walter et al. | 350/266 |
| 3,685,885 | 8/1972 | Scott | 350/271 |
| 3,717,171 | 2/1973 | Fawkes | 350/96.1 |

Primary Examiner—John K. Corbin
Assistant Examiner—Paul M. Dzierzynski
Attorney, Agent, or Firm—Jordan and Hamburg

[57] ABSTRACT

An apparatus for controlling the amount of converged light having a high energy density which is transmitted through a predetermined optical path. The apparatus or light switch is disposed in the vicinity of the optical path and operable either in a stepwise manner or in a stepless manner as desired. A flat plate made of isotropic graphite serves as a light interceptor and is driven by an operation member into and out of the optical path within a plane which is perpendicular to the optical path. The plate does not reflect the light or become heated by the light due to provision of heat radiator means.

5 Claims, 17 Drawing Figures

LIGHT TRANSMISSION CONTROL APPARATUS

BACKGROUND OF THE INVENTION

The present invention relates to an apparatus for controlling the amount of transmission of light having a high energy density through a desired optical path.

I have proposed an optical transmission system which is available for utilizing the solar energy for illumination and other various purposes. With this system, the solar energy is converged by a lens or the like into an optical conductor and transmitted therethrough to a desired location for a specific application. The lens is constructed to automatically follow the movement of the sun and, accordingly, the sunlight is constantly guided to the desired location throughout the duration of sunshine. It is sometimes desired, however, to temporarily shut off the sunrays coming into the intended location through the optical transmission system. For example, while the converged sunlight may comfort the old persons who are spending years in sickbeds if guided by the system into their rooms, it will rather put them to annoyance when they want to sleep in the daytime. Although a simple opaque member is usable to shut off the light, it will be heated or even burned due to such an energy density of the light. Additionally, it the opaque member has reflective surfaces, the member will reflect the light back into the lens or the like to adversely affect it.

SUMMARY OF THE INVENTION

An apparatus embodying the present invention controls the amount of converged light which has high energy density and is transmitted through a predetermined optical path. The apparatus includes a light interceptor member disposed in a plane perpendicular to the optical path to be movable between a first position for fully unblocking the optical path and a second position for fully blocking the optical path. The light intercepting member is made of isotropic graphite. The light interceptor member is operated by operation means selectively toward the first and second positions.

In accordance with the present invention, a light transmission control apparatus controls the amount of converged light having a high energy density which is transmitted through a predetermined optical path. The apparatus or light switch is disposed in the vicinity of the optical path and operable either in a stepwise manner or in a stepless manner as desired during light control. A flat plate made of isotropic graphite serves as a light interceptor and is driven by an operation member into and out of the optical path within a plane which is perpendicular to the optical path. The plate does not reflect the light or become heated by the light due to provision of a heat radiator means.

It is an object of the present invention to provide a light transmission control apparatus which effectively controls the transmission of light having a high energy density through a desired optical path.

It is another object of the present invention to provide a light transmission control apparatus which when exposed to such light does not reflect it or become heated thereby.

It is another object of the present invention to provide a light transmission control apparatus which minimizes light transmission loss and prevents leakage of light to the outside thereof.

It is another object of the present invention to provide a light transmission control apparatus which is capable of controlling the transmission of light either in a stepwise manner or in a stepless manner.

It is another object of the present invention to provide a generally improved light transmission control apparatus.

Other objects, together with the foregoing, are attained in the embodiments described in the following description and illustrated in the accompanying drawings.

BRIEF DESCRIPTION OF THE DRAWINGS

FIG. 5b is a view as seen in the direction of arrows b in FIG. 5a;

DESCRIPTION OF THE PREFERRED EMBODIMENTS

While the light transmission control apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
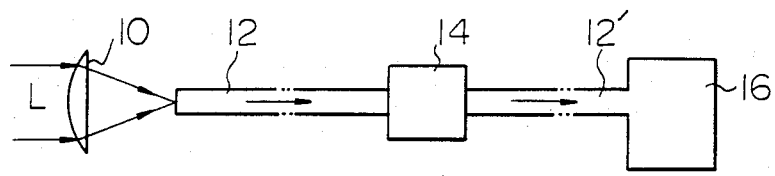
FIG. 1 is a schematic diagram of an optical system to which the present invention is applicable.

Referring to FIG. 1 of the drawings, an optical system to which the present invention is applicable includes a lens or lenses 10 adapted to converge sunlight L incident thereon. The optical path of the system is defined by a first optical cable 12 and a second optical cable 12' which face each other at their one end. The light transmission control apparatus of the present invention is generally designated by the reference numeral 14 and interposed between the first and second optical cables 12 and 12'. The other end of the cable 12 is located at the focal point of the lens 10, while the other end of the cable 12' is connected to an instrument, room or like desired spot or cite 16 where the optical energy of sunlight is to be used.

The lens 10 and input end of the cable 12 are arranged integrally with each other and automatically controlled by well known means so that the lens 10 may be constantly directed toward the sun. During daytime, therefore, sunlight is introduced into the optical cable 12 and, as long as the control apparatus 14 is in an unblocking position, the optical energy of the sunlight is fed to the cite 16 via the other optical cable 12'. While the control apparatus 14 is in a blocking position, it intercepts the light transmission through the optical path 12, 12' to the cite 16. In this respect, the control apparatus 14 will be called a "light switch" hereunder.

Figure 2A:
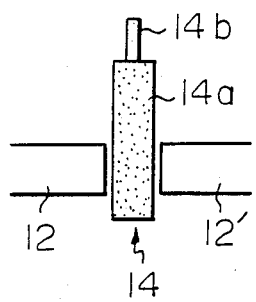
FIG. 2a is a side elevation of a light transmission control apparatus embodying the present invention.
Figure 2B:
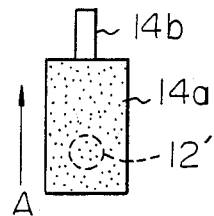
FIGS. 2b and 2c are front views of the apparatus of FIG. 2a shown in different positions.
Figure 2C:
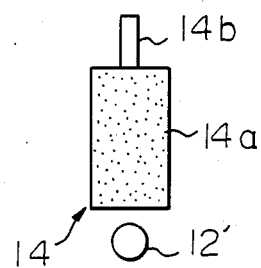

Referring to FIG. 2a, a first embodiment of the light switch 14 is illustrated in detail. The switch 14 comprises a flat light interceptor plate 14a made of isotropic graphite and a member 14b for operating the light interceptor 14a within a plane perpendicular to the optical path 12, 12'. The blocking or "OFF" position of the switch 14 is illustrated in FIG. 2b in which the light interceptor 14a fully blocks the optical path between the cables 12 and 12'. When the light interceptor 14a is moved from the "OFF" position to the unblocking or "ON" position shown in FIG. 2c as indicated by an arrow A, it fully unblocks the optical path to allow the optical energy from the cable 12 to propagate to the cite 16 via the other cable 12'.

If desired, the light interceptor 14a may be formed with an opening which is equal to or larger in diameter than each cable 12 or 12' so that the opening will become aligned with the facing ends of the cables 12 and 12' in the "ON" position of the switch 14. This minimizes the required stroke of the plate 14a between the "ON" and "OFF" positions.

Figure 3A:
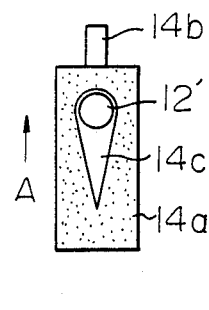
FIGS. 3a and 3b are front views of another embodiment of the present invention.
Figure 3B:
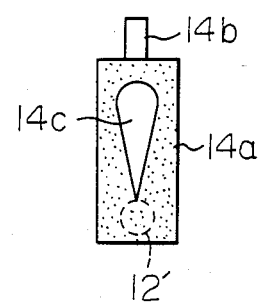

Referring to FIGS. 3a and 3b, another embodiment of the present invention is shown which has a light restricting or attenuating function in addition to the simple ON-OFF control function mentioned above. The attenuation is achieved with a slot 14c formed through the light interceptor 14a. The slot 14c is tapered in the direction of movement A of the light interceptor 14a such that the area at its upper end is largest and identical with the cross-sectional area of the optical path 12, 12'. In the position shown in FIG. 3a, the interceptor 14a permits all the light transmitted through the cable 12 to be transferred to the cable 12' via the slot 14c. As the interceptor 14a is moved from the position shown in FIG. 3a as indicated by the arrow A, the slot 14c progressively restricts the effective area of the optical path between the cables 12 and 12' and, thereby, the amount of light transmitted therethrough. In the position shown in FIG. 3b, the interceptor 14a fully blocks the light transmission from the cable 12 over to the cable 12'. While the light switch shown in FIGS. 3a and 3b attenuates the light in a stepless mode with the slot 14c, the attenuation may be accomplished in a stepwise mode as will be described.

Figure 4A:
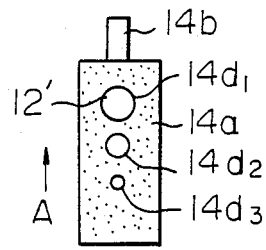
FIGS. 4a and 4b are views similar to FIGS. 3a and 3b but showing another embodiment of the present invention.
Figure 4B:
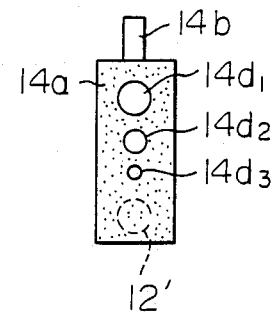

Referring to FIGS. 4a and 4b, the light interceptor 14a is formed with a plurality of openings $14d_1$–$14d_3$ which are aligned with each other along the direction of movement A of the interceptor 14a. The openings $14d_1$–$14d_3$ are so dimensioned as to have the illustrated relationship in diameter. In the position shown in FIG. 4a, all the output light from the cable 12 is transferred through the largest opening $14d_1$ to the cable 12'. As the interceptor 14a is moved in the direction A until desired one of the openings $14d_2$ and $14d_3$ become aligned with the cables 12 and 12', only the part of the light transmitted through the selected smaller opening is transferred to the cable 12'. Finally, in the position in FIG. 4b, the interceptor 14a fully blocks up the optical path between the cables 12 and 12'. It should be noted that the three openings $14d_1$–$14d_3$ are not restrictive but only illustrative and may be replaced by four or more openings as long as their diameters are designed for stepwise light control.

Figure 5A:
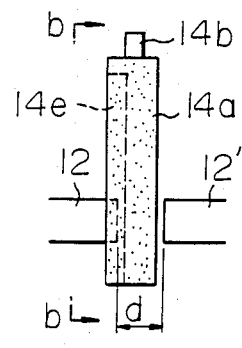
FIG. 5a is a side elevation of another embodiment of the present invention.
Figure 5B:
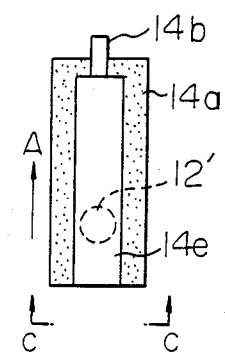
Figure 5C:
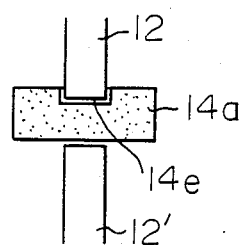
FIG. 5c is a view as seen in the direction of arrows c in FIG. 5b.

Referring to FIGS. 5a–5c, another embodiment of the present invention is shown in which the light interceptor 14a is formed with a recess or channel 14e extending in the direction of movement A of the interceptor 14a. The channel 14e is adapted to receive the adjacent end of the cable 12. An advantage attainable with this arrangement is that the light coming out through the cable 12 is prevented from leaking to the outside when the switch 14 is brought to the "OFF" position shown in FIGS. 5a and 5b. Another advantage is that the channel 14e permits the opposite cables 12 and 12' to be located at a shorter distance d from each other, thereby minimizing the light transmission loss in the "ON" position of the switch 14.

Figure 5D:
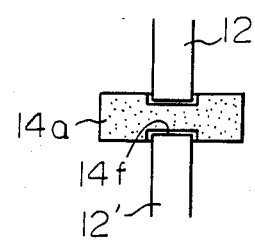
FIG. 5d is a view similar to FIG. 5c but showing a modification to the embodiment of FIGS. 5a-5c.

To further reduce the spacing d between the cables 12 and 12' and, accordingly, the light transmission loss, the light interceptor 14a may be formed with a channel 14f in its surface which faces the cable 12', as shown in FIG. 5d, in addition to the channel 14e on the surface adjacent to the cable 12. It will be clear that the plate 14a shown in FIGS. 5a–5c or 5d may be formed along its channel 14e or channels 14e and 14f with the tapered slot 14c shown in FIGS. 3a and 3b or the openings $14d_1$–$14d_3$ shown in FIGS. 4a and 4b.

Figure 6:
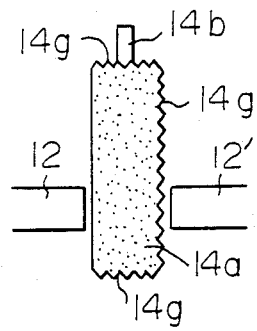
FIGS. 6 and 7 are side elevations of other embodiments of the present invention which are furnished with different examples of heat radiator means.
Figure 7:
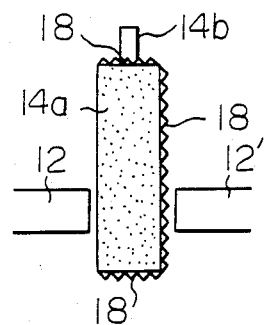

Referring to FIG. 6, another embodiment of the present invention is shown which employs heat radiator means for the light interceptor 14a. The heat radiator means comprises corrugation 14g formed on at least one of the back and side surfaces of the light interceptor 14a. Alternatively, the heat radiator means may comprise a corrugated heat radiator plate 18 mounted on the back surface and/or the side surface of the light interceptor 14a. In any one of the constructions shown in FIGS. 6 and 7, it is preferable to except the specific portion of the interceptor 14a which is opposed by the cable 12' in applying the heat radiator means to the interceptor 14a. Should the heat radiator means cover even such a portion, it would increase the distance between the adjacent ends of the cables 12 and 12' and, accordingly, the light transmission loss in the "ON" position of the switch.

Figure 8A:
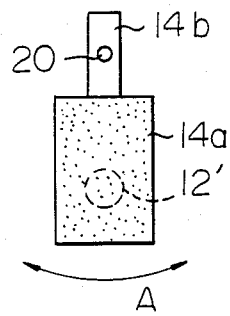
FIGS. 8a and 8b are front views of still another embodiment of the present invention.
Figure 8B:
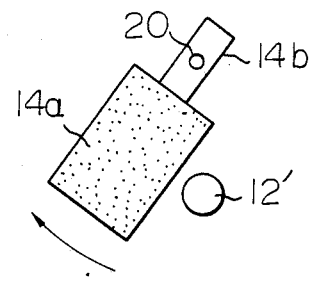
Figure 9:
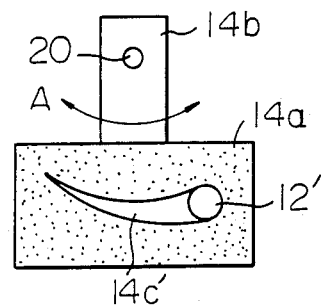
FIG. 9 is a front view of a farther embodiment of the present invention.

Referring to FIGS. 8a and 8b, another embodiment of the present invention is shown. The light interceptor 14a in this embodiment is designed for pivotal movement about a pin 20 as indicated by an arrow A to turn on and off the switch as desired. The switch is shown in the "OFF" position in FIG. 8a and in the "ON" position in FIG. 8b. The pivotal plate 14a may be formed with an arcuate tapered slot 14c' if desired, as illustrated in FIG. 9. The aucuate slot 14c' serves the same function as the slot 14c which has been described with reference to FIGS. 3a and 3b. It will thus be apparent that the pivotal type of switch shown in FIG. 9 may be provided with the tapered slot 14c or openings $14d_1$–$14d_3$, channel 14e with or without the channel 14f, heat radiator means 14g or 18 or the like either independently or in combination.

In summary, it will be seen that the present invention provides a light transmission control apparatus or light switch which effectively blocks, unblocks and/or attenuates the transmission of light having a high energy density.

Various modifications will become possible for those skilled in the art after receiving the teachings of the present disclosure without departing from the scope thereof.

What is claimed is:

1. A solar switch for controlling the transmission of solar energy to the location where the transmitted solar energy is utilized, comprising converging means for converging the sunlight into light having a high energy density, a first optical cable into which the sunlight is converged by said converging means, said first cable having an end face, a second optical cable having an end face, said two end faces being spaced from one another at a predetermined spacing, said first and second cables defining an optical path for introducing and passing therethrough said converged light of high energy density, a light interceptor means comprising isotropic graphite disposed in a plane perpendicular to said optical path and movable between a first position within said space between said first and second end faces for blocking said optical path and a second position removed from said space for unblocking said optical path, said light interceptor means having a channel, at least one of said end faces being disposed within said channel to thereby prevent leakage of light when the solar switch is in said first position blocking said path, whereby said light interceptor means thereby functions as a solar switch for controlling the transmission of solar energy to said location where the solar energy is utilized.

2. A solar switch according to claim 1, further comprising a heat radiator means for radiating heat which is accumulated in the light interceptor means, said heat radiator means comprising corrugations formed on at least one of the back and side surfaces of said light interceptor means.

3. A solar switch according to claim 2, in which the heat radiator means comprises a flat heat radiator element mounted on at least one of the back and side surfaces of the light interceptor means.

4. A solar switch according to claim 1, wherein said channel is constructed and arranged to have a configuration such that said one end face passes along and within said channel as said light interceptor member moves between said first and second positions.

5. A solar switch according to claim 1, wherein there are two of said channels on opposite sides of said light interceptor member, said one end face being disposed in one of said channels, the other of said end faces being disposed in the other of said channels, whereby the space between said two end faces is reduced such that the light transmission loss is also reduced.

* * * * *